(12) United States Patent
Michaud et al.

(10) Patent No.: US 10,696,879 B2
(45) Date of Patent: Jun. 30, 2020

(54) ADHESIVE DUAL-COMPONENT COMPOSITION BASED ON POLYURETHANE

(71) Applicant: Bostik SA, La Plaine Saint Denis (FR)

(72) Inventors: Guillaume Michaud, Compiegne (FR); Marjorie Pereira-Bayart, Pontoise les Noyon (FR)

(73) Assignee: Bostik SA, La Plaine Saint Denis (FR)

( * ) Notice: Subject to any disclaimer, the term of this patent is extended or adjusted under 35 U.S.C. 154(b) by 11 days.

(21) Appl. No.: 16/316,362

(22) PCT Filed: Jul. 10, 2017

(86) PCT No.: PCT/FR2017/051887
§ 371 (c)(1),
(2) Date: Jan. 9, 2019

(87) PCT Pub. No.: WO2018/011504
PCT Pub. Date: Jan. 18, 2018

(65) Prior Publication Data
US 2019/0241779 A1    Aug. 8, 2019

(30) Foreign Application Priority Data
Jul. 12, 2016    (FR) ...................................... 16 56680

(51) Int. Cl.
| | | |
|---|---|---|
| *C09J 175/04* | (2006.01) |
| *B32B 7/12* | (2006.01) |
| *B32B 15/095* | (2006.01) |
| *C08K 5/17* | (2006.01) |
| *C08G 18/76* | (2006.01) |
| *B32B 27/30* | (2006.01) |
| *B32B 29/00* | (2006.01) |
| *C08G 18/79* | (2006.01) |
| *C08G 71/04* | (2006.01) |
| *C08L 79/02* | (2006.01) |
| *B32B 27/34* | (2006.01) |
| *C08G 18/40* | (2006.01) |
| *C08G 18/42* | (2006.01) |
| *B32B 27/08* | (2006.01) |
| *B32B 27/36* | (2006.01) |
| *C08G 18/22* | (2006.01) |
| *C08G 18/48* | (2006.01) |
| *C08G 18/28* | (2006.01) |
| *B32B 27/32* | (2006.01) |
| *B32B 15/08* | (2006.01) |
| *B32B 27/28* | (2006.01) |
| *B32B 15/20* | (2006.01) |
| *C08G 18/12* | (2006.01) |
| *C08G 18/34* | (2006.01) |
| *C08G 18/73* | (2006.01) |
| *C08G 18/75* | (2006.01) |

(52) U.S. Cl.
CPC ............... *C09J 175/04* (2013.01); *B32B 7/12* (2013.01); *B32B 15/08* (2013.01); *B32B 15/095* (2013.01); *B32B 15/20* (2013.01); *B32B 27/08* (2013.01); *B32B 27/28* (2013.01); *B32B 27/302* (2013.01); *B32B 27/304* (2013.01); *B32B 27/306* (2013.01); *B32B 27/32* (2013.01); *B32B 27/34* (2013.01); *B32B 27/36* (2013.01); *B32B 29/002* (2013.01); *C08G 18/12* (2013.01); *C08G 18/222* (2013.01); *C08G 18/289* (2013.01); *C08G 18/348* (2013.01); *C08G 18/4018* (2013.01); *C08G 18/4288* (2013.01); *C08G 18/4812* (2013.01); *C08G 18/4825* (2013.01); *C08G 18/4829* (2013.01); *C08G 18/4841* (2013.01); *C08G 18/4845* (2013.01); *C08G 18/73* (2013.01); *C08G 18/755* (2013.01); *C08G 18/7621* (2013.01); *C08G 18/792* (2013.01); *C08G 71/04* (2013.01); *C08K 5/17* (2013.01); *C08L 79/02* (2013.01); *B32B 2255/10* (2013.01); *B32B 2305/72* (2013.01); *B32B 2307/306* (2013.01); *B32B 2307/546* (2013.01); *B32B 2307/7244* (2013.01); *B32B 2307/732* (2013.01); *B32B 2439/70* (2013.01)

(58) Field of Classification Search
CPC ....................................................... C09J 175/04
See application file for complete search history.

(56) References Cited

U.S. PATENT DOCUMENTS

| | | | | |
|---|---|---|---|---|
| 2007/0151666 A1* | 7/2007 | Moeller | ................ | C08G 71/00 156/327 |
| 2017/0088661 A1* | 3/2017 | Michaud | ................ | C08G 18/69 |

FOREIGN PATENT DOCUMENTS

WO    2015140458 A1    9/2015

OTHER PUBLICATIONS

ISA/EP; International Search Report and Written Opinion for International Application No. PCT/FR2017/051887 dated Jul. 9, 2017, 10 pages.

* cited by examiner

*Primary Examiner* — Daniel H Lee
(74) *Attorney, Agent, or Firm* — NK Patent Law

(57) ABSTRACT

The invention relates to an adhesive dual-component composition comprising a composition A based on a polyurethane prepolymer with cyclocarbonate terminations and a composition B based on a mixture comprising at least one diamine B1 comprising only two primary amine groups of the —$CH_2$—$NH_2$ type and at least one polyamine B2 comprising at least three primary amine groups of the —$CH_2$—$NH_2$ type. The invention also relates to a multilayer structure produced from the adhesive composition according to the invention and to the method for the production thereof.

15 Claims, No Drawings

ADHESIVE DUAL-COMPONENT COMPOSITION BASED ON POLYURETHANE

CROSS-REFERENCE TO RELATED APPLICATIONS

This application is a U.S. National Stage application of International Application No. PCT/FR2017/051887, filed on Jul. 10, 2017, which claims the benefit of French Patent Application No. 1656680, filed Jul. 12, 2016.

FIELD OF THE INVENTION

The present invention relates to a two-component polyurethane-based adhesive composition. The invention also relates to a multilayer structure (or complex) that can be used in particular in the field of flexible packaging, which comprises at least two layers of material bonded together by a layer of the adhesive composition according to the invention. It also relates to a complexing process suitable for the manufacture of said complex.

TECHNOLOGICAL BACKGROUND

The flexible packagings intended for the packaging of the most diverse products, such as those manufactured for the agri-food, cosmetics or detergents industries, generally consist of several thin layers (in the form of sheets or films), the thickness of which is between 5 and 150 µm and which consist of various materials, such as paper, a metal (for example aluminum) or else thermoplastic polymers. The corresponding complex (or multilayer) film, the thickness of which may vary from 20 to 400 µm, makes it possible to combine the properties of the various individual layers of material and to thus provide the consumer with a set of characteristics suitable for the final flexible packaging, such as, for example:

- its visual appearance (in particular that of the printed elements presenting the information relating to the packaged product and intended for the consumer),
- a barrier effect to atmospheric moisture or to oxygen,
- contact with food without risk of toxicity or of modification to the organoleptic properties of the packaged foodstuffs,
- chemical resistance for certain products, such as ketchup or liquid soap,
- good behavior at high temperature, for example in the case of pasteurization or sterilization.

In order to form the final packaging, the multilayer is generally shaped by heat sealing at a temperature varying from approximately 120 to 250° C., the latter technique also being used for closing the packaging around the product intended for the consumer.

The various layers of material of which the multilayer is composed are combined or assembled by laminating during industrial complexing processes (also referred to as lamination processes.

These processes employ adhesives and devices (or machines) designed for this purpose. The multilayer film thus obtained is often itself described by the term "laminate".

These processes first of all comprise a step of coating the adhesive over a first layer of material, which consists of a deposition of a continuous layer of adhesive with a controlled thickness generally of less than 10 µm, corresponding to an amount of adhesive (or spread) which is also controlled, generally not exceeding 10 g/m². This coating step is followed by step of laminating a second layer of material, identical to or different from the first, consisting of the application, under pressure, of this second layer of material to the first layer of material covered with the layer of adhesive.

NCO-terminated polyurethane-based adhesives are commonly used for this type of application.

However, NCO-terminated polyurethane-based compositions generally have the drawback of comprising considerable residual contents of aromatic diisocyanate originating from the reaction for the synthesis of the polyurethane, which are capable of resulting in a certain number of drawbacks, in particular toxicity problems. Specifically, the non-labelling of polyurethanes requires residual diisocyanate contents of less than 0.1% by weight. In order to obtain such low residual contents, the production processes may be restrictive. Moreover, it has been observed that polyurethane compositions having an MDI (aromatic diisocyanate) monomer content of less than or equal to 1% by weight relative to the weight of the polyurethane composition, are highly viscous at ambient temperature and have a stability problems over time in terms of viscosity.

Document US 2007/0151666 describes an adhesive composition comprising a first constituent A based on a compound having at least two cyclocarbonate groups and a second constituent B based on a compound having at least two primary and/or secondary amine groups. The compositions described in this document did not make it possible to obtain a multilayer structure that is resistant to a high-temperature heat treatment, such as a sterilization. In particular, it has been observed that the multilayer structure obtained with such compositions has, after heat treatment in an autoclave, signs of degradation of the adhesive joint (presence of blisters, bubbles and/or de-crosslinking of the adhesive joint), in particular making said multilayer unsuitable for the manufacture of flexible packagings intended for packaging products.

The objective of the present invention is to provide a polyurethane-based adhesive composition that is substantially, or even completely, free of residual polyisocyanate monomers, in particular of aromatic diisocyanate type (compound where the NCO function is directly bonded to an aromatic ring), and which has a better heat resistance, in particular that has a better behavior with respect to the sterilization test.

SUMMARY OF THE INVENTION

A first subject matter of the invention relates to an adhesive composition comprising:
- a composition A comprising at least one cyclocarbonate-terminated polyurethane prepolymer, and
- a composition B comprising:
  - at least one diamine B1 comprising only two —$CH_2NH_2$ groups, and
  - at least one polyamine B2 comprising at least three —$CH_2NH_2$ groups, composition B wherein the diamine B1:polyamine B2 weight ratio ranges from 30/70 to 70/30.

According to one embodiment, the cyclocarbonate-terminated polyurethane prepolymer is obtained by reaction of an NCO-terminated polyurethane and a glycerol cyclocarbonate.

According to one embodiment, the cyclocarbonate-terminated polyurethane prepolymer is prepared by a process comprising the following steps:

E1) the preparation of an NCO-terminated polyurethane prepolymer by a polyaddition reaction:
  i) of at least one polyisocyanate selected from diisocyanates and triisocyanates,
  ii) with at least one polyol selected from polyether polyols and polyester polyols, and mixtures thereof; followed by
E2) the reaction of the product formed in the first step E1) with at least one glycerol cyclocarbonate in an amount such that all of the NCO groups present in the reaction medium at the end of step E1) react in the presence of the glycerol cyclocarbonate.

Preferably, at least one polyol is selected from polyester polyols.

According to one embodiment, the diamine B1 or the mixture of diamines B1 has a primary alkalinity ranging from 3.00 to 20.00 meq/g, preferably ranging from 9.00 to 15.00 meq/g.

According to one embodiment, the polyamine B2 or the mixture of polyamines B2 has a primary alkalinity from 8.00 to 21.00 meq/g, preferably ranging from 9.00 to 18.00 meq/g.

According to one embodiment, the composition B has a ratio of the primary alkalinity to the total alkalinity ranging from 0.25 to 0.70.

According to one embodiment, the molar ratio of the number of primary amine functions to the number of cyclocarbonate functions ranges from 0.8 to 1.2, preferably from 0.9 to 1.1.

According to one embodiment, the adhesive composition further comprises at least one crosslinking catalyst.

The invention also relates to a ready-to-use kit comprising the adhesive composition according to the invention, characterized in that the compositions A and B are packaged in two separate compartments.

Another subject of the invention is a multilayer structure comprising at least two layers of material bonded together by an adhesive layer, characterized in that said adhesive layer consists of the adhesive composition according to the invention, in the crosslinked state.

According to one embodiment, the adhesive layer has a thickness ranging from 1.5 to 5 μm.

According to one embodiment, the multilayer structure comprises at least one layer of aluminum-based material.

Another subject of the invention is a process for manufacturing a multilayer structure according to the invention, comprising the following steps:
  the mixing of the composition A and of the composition B, then
  the coating of said mixture over the surface of a first layer of material, then
  the laminating of the surface of a second layer of material over said coated surface, then
  the crosslinking of said mixture.

According to one embodiment of the manufacturing process, the mixture of the composition A and the composition B comprises at least one solvent and the process further comprises a step of evaporating the solvent(s).

The adhesive composition according to the invention may be used for the manufacture of complexes having layers (substrates) of various natures, in particular for the manufacture of top of the range multilayer structures comprising layers of material that are difficult to adhesively bond to one another.

The complexes according to the invention have an improved thermal resistance, in particular they are more resistant to the sterilization test.

The complexes according to the invention may be used in food packagings, with no risk of toxicity.

DETAILED DESCRIPTION OF THE EMBODIMENTS OF THE INVENTION

In the present patent application, unless otherwise indicated:
  the amounts expressed in the percentage form correspond to weight/weight percentages;
  a cyclocarbonate group is understood to denote the (2-oxo-1,3-dioxolan-4-yl)methylcarbamate) group, i.e. a monovalent group corresponding to the following formula:

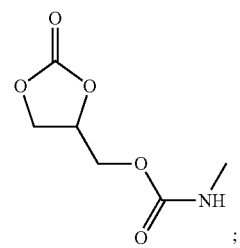

the expression "polyurethane prepolymer" denotes an intermediate in the synthesis of a polyurethane, corresponding to a polymer comprising in its main chain at least two urethane groups and at least two reactive functions (for example isocyanate or cyclocarbonate functions) enabling it to undergo at least one polyaddition reaction. Such a polyurethane prepolymer is capable of being obtained by polyaddition reaction of at least one polyol with at least one polyisocyanate.

In particular, the expression "NCO-terminated polyurethane prepolymer" denotes a polyurethane prepolymer comprising at least two isocyanate (NCO) groups enabling it to undergo a polyaddition reaction in the presence of a glycerol carbonate. Such an NCO-terminated polyurethane prepolymer is capable of being obtained by polyaddition reaction of at least one polyol with a stoichiometric excess of polyisocyanate(s). This stoichiometric excess may be expressed by an NCO/OH molar ratio strictly greater than 1, which corresponds to the molar ratio of the number of isocyanate (NCO) groups to the number of hydroxyl (OH) groups borne by the species bearing such functions present in the reaction medium for the preparation of the polyurethane.

In particular, the expression "cyclocarbonate-terminated polyurethane prepolymer" denotes a polyurethane prepolymer comprising at least two cyclocarbonate groups enabling it to undergo a polyaddition reaction in the presence of a polyamine. Such a cyclocarbonate-terminated polyurethane is obtained by complete functionalization of the isocyanate groups of a polyisocyanate with the aid of glycerol carbonate. The complete functionalization of the isocyanate groups by glycerol carbonate may be obtained by mixing the reagents in a stoichiometric amount or with a stoichiometric excess of glycerol carbonate. This is expressed by an NCO/OH molar ratio less than or equal to 1.

the NCO/OH molar ratio (denoted by r1 for the preparation of the NCO-terminated prepolymer), corresponds to the molar ratio of the number of isocyanate groups to the number of hydroxyl groups borne respectively by all of the isocyanate(s) and polyol(s) present in the reaction medium of step E1.

the NCO/OH molar ratio (denoted by r2 for the preparation of the cyclocarbonate-terminated prepolymer), corresponds to the molar ratio of the number of unreacted isocyanate groups at the end of the preceding step (E1) to the number of hydroxyl groups borne respectively by all of the isocyanate(s) and alcohol(s) present in the reaction medium of step E2.

the hydroxyl value of an alcoholic compound (in particular polyol or glycerol carbonate which may be pure on the form of a mixture) represents the number of hydroxyl functions per gram of product, and is expressed in the text of the present application in the form of the equivalent number of milligrams of potassium hydroxide (KOH) used in the titration of the hydroxyl functions, per gram of product.

the primary alkalinity represents the number of —NH$_2$ functions per gram of product, and is expressed in the text of the present application in the form of the number of milliequivalents of —NH$_2$ per gram of product. It may be measured by NMR or by potentiometric analysis according to methods well known to those skilled in the art.

the total alkalinity represents the number of amino functions (of primary, secondary and tertiary amine-type) per gram of product, and is expressed in the text of the present application in the form of milliequivalents of HCl per gram of product. The total alkalinity may be determined by potentiometric titration.

the NH$_2$/cyclocarbonate (CC) molar ratio, denoted by r3, corresponds to the molar ratio of the number of NH$_2$ groups to the number of cyclocarbonate groups in the adhesive composition.

the viscosity measurement at 23° C. may be carried out using a Brookfield viscometer according to the ISO 2555 standard. Typically, the measurement performed at 23° C. may be carried out using a Brookfield RVT viscometer, a spindle suitable for the viscosity range and at a speed of rotation of 20 revolutions per minute (rpm). The viscosity of the product is preferably measured at least 24 hours after manufacture of said product.

the various embodiments described in the present application may be combined together.

The present invention relates to a two-component adhesive composition comprising:
a composition A comprising at least one cyclocarbonate-terminated polyurethane prepolymer, and
a composition B comprising:
at least one diamine B1 comprising only two —CH$_2$NH$_2$ groups, and
at least one polyamine B2 comprising at least three —CH$_2$NH$_2$ groups,
composition B wherein the diamine B1:polyamine B2 weight ratio ranges from 30/70 to 70/30.

Composition A

The cyclocarbonate-terminated polyurethane prepolymer may represent from 10% to 100% by weight of the composition A, preferably from 20% to 95% by weight, more preferentially from 30% to 90% by weight, and better still from 40% to 80% by weight, relative to the total weight of the composition A.

The cyclocarbonate-terminated polyurethane prepolymer used according to the invention may be prepared by a process comprising the following steps:
E1) the preparation of an NCO-terminated polyurethane prepolymer by a polyaddition reaction:

i) of at least one polyisocyanate selected from diisocyanates and triisocyanates,
ii) with at least one polyol selected from polyether polyols and polyester polyols, and mixtures thereof; followed by
E2) the reaction of the product formed in the first step E1) with at least one glycerol cyclocarbonate in an amount such that all of the NCO groups present in the reaction medium at the end of step E1) react in the presence of the glycerol cyclocarbonate.

During step E1), use is generally made of amounts of polyisocyanate and of polyol such that all of the oh H groups react in the presence of the polyisocyanate(s) present in the reaction medium, preferably leading to an NCO/OH molar ratio r1 ranging from 1.6 to 1.9.

During step E1), the polyaddition reaction is carried out at a temperature preferably below 95° C. and under conditions that are preferably anhydrous.

During step E2), use is generally made of an amount of glycerol carbonate (also referred to as 4-(hydroxymethyl)-1,3-dioxolan-2-one) leading to an NCO/OH molar ratio r2 ranging from 0.9 to 1.0, preferably from 0.95 to 1.0.

During step E2), the polyaddition reaction is carried out at a temperature preferably below 95° C. and under conditions that are preferably anhydrous.

The polyol(s) that can be used for preparing the NCO-terminated polyurethane prepolymer used according to the invention may be selected from those for which the number-average molar mass ranges from 300 to 4000 g/mol, preferably from 400 to 3000 g/mol and better still from 500 to 2000 g/mol.

Personally, there hydroxyl functionality ranges from 2 to 3. The hydroxyl functionality is the mean number of hydroxyl functions per mole of polyol.

Preferably, the polyol(s) that can be used according to the invention has (have) a (mean) hydroxyl value (OHV) ranging from 20 to 600 milligrams of KOH per gram of polyol (mg KOH/g), preferably from 35 to 430 mg KOH/g, more preferably from 55 to 340 mg KOH/g. According to one particular embodiment, the hydroxyl value of polyol(s) having a hydroxyl functionality of 2 ranges from 20 to 380 mg KOH/g, preferably from 35 to 290 mg KOH/g, more preferably from 50 to 230 mg KOH/g. According to embodiment, the hydroxyl value of polyol(s) having a hydroxyl functionality of 3 ranges from 40 to 570 mg KOH/g, preferably from 55 to 430 mg KOH/g, more preferably from 80 to 340 mg KOH/g.

The polyol(s) may be selected from polyether polyols, polyester polyols and the mixtures of polyether polyols and polyester polyols, preferably from the mixtures of polyether polyols and polyester polyols. Thus, according to this embodiment, the cyclocarbonate-terminated polyurethane prepolymer has both polyether moieties and polyester moieties.

The polyether polyol(s) that can be used according to the invention is (are) preferably selected from polyoxyalkylene polyols, the linear or branched alkylene part of which comprises from 2 to 4 carbon atoms, more preferentially from 2 to 3 carbon atoms.

More preferentially, the polyether polyol(s) that can be used according to the invention is (are) preferably selected from polyoxyalkylene diols or polyoxyalkylene triols, the linear or branched alkylene part of which comprises from 1 to 4 carbon atoms, more preferentially from 2 to 3 carbon atoms.

Mention may be made, as examples of polyoxyalkylene diols or triols that can be used according to the invention, of:

polyoxypropylene diols or triols (also denoted by polypropylene glycol (PPG) diols or triols) having a number-average molar mass ranging from 300 to 4000 g/mol;
polyoxyethylene diols or triols (also denoted by polyethylene glycol (PEG) diols or triols) having a number-average molar mass ranging from 300 to 4000 g/mol;
and mixtures thereof.

The abovementioned polyether polyols are prepared conventionally and are widely available commercially. They may be obtained by polymerization of the corresponding alkylene oxide in the presence of a basic catalyst (for example potassium hydroxide) or a catalyst based on a double metal/cyanide complex.

Mention may be made, as an example of a polyether diol, of the polyoxypropylene diol sold under the name "Voranol® P 400" by Dow, with a number-average molar mass in the vicinity of 400 g/mol and the hydroxyl value of which ranges from 250 to 270 mg KOH/g.

Mention may be made, as an example of a polyether triol, of the polyoxypropylene triol sold under the name "Voranol® CP 450" by Dow, with a number-average molar mass in the vicinity of 450 g/mol and the hydroxyl value of which ranges from 370 to 396 mg KOH/g.

The polyester polyols may be selected from polyester diols and polyester triols, and preferably from polyester diols.

Mention may be made, as an example of a polyester diol, of the "Realkyd® XTR 10410" sold by Arkema, with a number-average molar mass in the vicinity of 1000 g/mol and the hydroxyl value of which ranges from 108 to 116 mg KOH/g. It is a product derived from the condensation of adipic acid, diethylene glycol and monoethylene glycol.

The polyisocyanate(s) that can be used for preparing the polyurethane used according to the invention may be added sequentially or reacted in the form of a mixture.

The diisocyanate(s) that can be used during step E1) may be of formula OCN—$R^1$—NCO where $R^1$ represents a linear, branched or cyclic alkylene divalent radical comprising from 5 to 140 carbon atoms, preferably from 6 to 70 carbon atoms, more preferably from 7 to 40 carbon atoms, more preferentially still from 8 to 24 carbon atoms.

According to one embodiment, $R^1$ is selected from one of the following divalent radicals, the formulae of which below reveal the 2 free valences:

a) the divalent radical derived from isophorone:

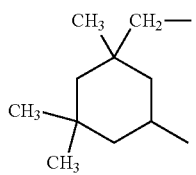

b) the radical derived from 4,4'-HDMI:

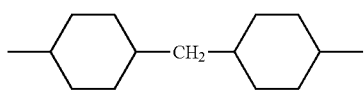

c) the divalent radical derived from 2,4-TDI or from 2,6-TDI:

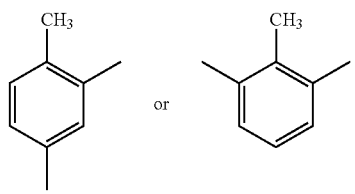

d) the divalent radical derived from 2,4'-MDI or from 4,4'-MDI:

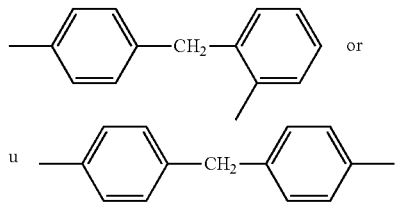

e) the divalent radical —$(CH_2)_6$— (or hexamethylene radical), which is derived from hexadimethylene diisocyanate (HDI)

f) the divalent radical derived from a xylene diisocyanate (such as m-XDI):

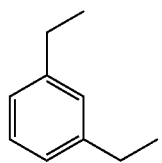

g) the divalent radical derived from tetramethylxylene diisocyanate (such as m-TMXDI):

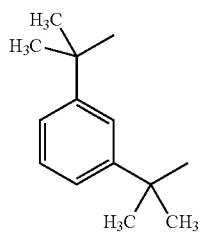

h) the divalent radical derived from an HDI allophanate of formula (Y) below:

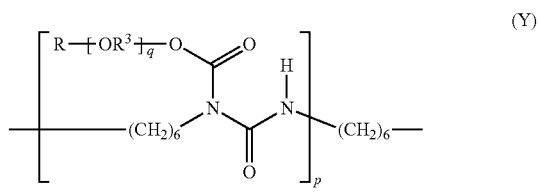

in which:
p is an integer ranging from 1 to 2;
q is an integer ranging from 0 to 9, and preferably from 2 to 5;

R represents a saturated or unsaturated, linear or branched, cyclic or acyclic, hydrocarbon chain comprising from 1 to 20 carbon atoms, preferably from 6 to 14 carbon atoms;

$R^3$ represents a linear or branched, alkylene divalent group having from 2 to 4 carbon atoms, and preferably a propylene divalent group.

Preferably, p, q, R and $R^3$ are chosen such that the HDI allophanate derivative above comprises an NCO isocyanate group content ranging from 12 to 14% by weight, relative to the weight of said derivative.

The triisocyanate(s) that can be used according to the invention may be selected from isocyanurates, biurets, and adducts of diisocyanates and of triols.

In particular, the isocyanurate(s) may be used in the form of a technical mixture of (poly)isocyanurate(s) with a purity of greater than or equal to 70% by weight of isocyanurate(s).

Preferably, the diisocyanate isocyanurate(s) that can be used according to the invention correspond(s) to the following general formula (W):

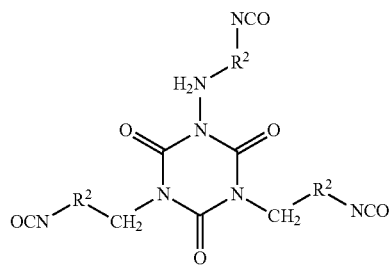

(W)

in which:

$R^2$ represents a linear, branched or cyclic and aliphatic or aromatic alkylene group comprising from 4 to 9 carbon atoms, with the proviso that the NCO groups are not connected via a covalent bond to a carbon atom forming part of an aromatic hydrocarbon ring, such as a phenyl group.

Mention be made, as examples of diisocyanate trimers that can be used according to the invention, of:

the isocyanurate trimer of hexamethylene diisocyanate (HDI)

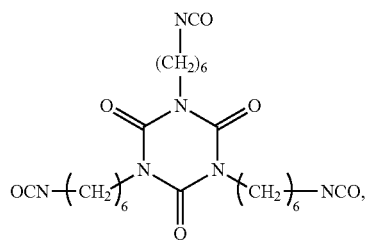

the isocyanurate trimer of isophorone diisocyanate (IPDI):

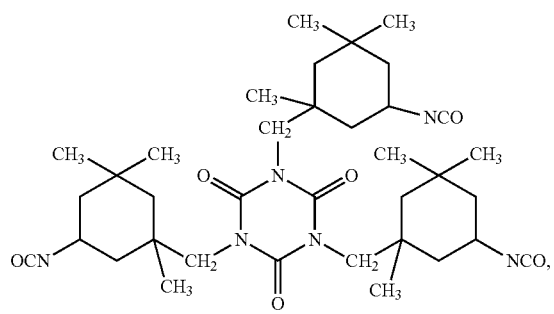

the isocyanurate trimer of pentamethylene diisocyanate (PDI):

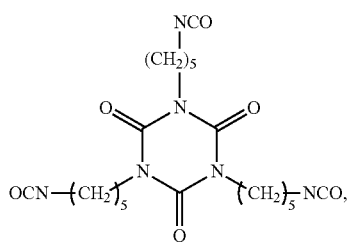

the isocyanurate trimer of meta-xylene diisocyanate (m-XDI):

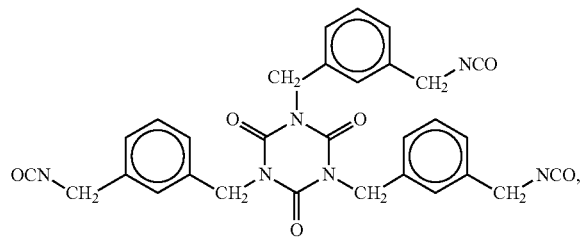

the isocyanurate trimer of m-XDI, in the hydrogenated form:

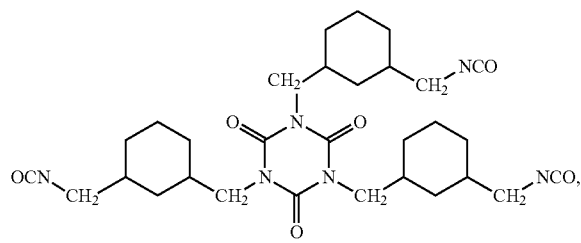

The diisocyanate(s) that can be used to prepare the adducts of diisocyanate and triol is (are) preferably selected from aromatic or aliphatic diisocyanate monomers, and mixtures thereof, and more preferentially aliphatic diisocyanate monomers. The diisocyanate monomer(s) may be in the form of a pure isomer or in the form of a mixture of isomers.

Mention may be made, as triols that can be used to prepare the adducts of diisocyanate and triol, for example, of glycerol, trimethylolmethane (TMM), trimethylolethane (TME) and trimethylolpropane (TMP). Preferably, TMP is used.

Mention may be made, by way of example of adducts of diisocyanates and of triols that can be used according to the invention, of the adduct of meta-xylene diisocyanate and of trimethylolpropane, as represented below.

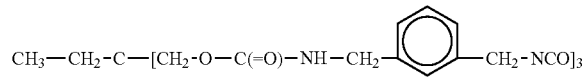

The polyisocyanate(s) that can be used to prepare the polyurethane used according to the invention are widely available commercially. By way of example, mention may be made of "Scuranate® TX" sold by Vencorex, corresponding to a 2,4-TDI with a purity of the order of 95%, "Scuranate® T100" sold by Vencorex, corresponding to a 2,4-TDI with a purity of greater than 99% by weight, "Desdomur® I" sold by Covestro, corresponding to an IPDI or else "Desdomur® N3300" sold by Covestro, corresponding to an isocyanurate of HDI.

Preferably, the amounts of polyisocyanate(s) and/or polyol(s) used during step E1) are such that the NCO/OH molar ratio, denoted by r1, ranges from 1.6 to 1.9, and preferably from 1.69 to 1.85.

When the cyclocarbonate-terminated polyurethane prepolymer is obtained during step E1) from a mixture of polyisocyanates or from several polyisocyanates added successively, the calculation of the ratio r1 takes into account, on the one hand, NCO groups borne by all of the polyisocyanates present in the reaction medium of step E1, and, on the other hand, OH groups borne by the polyol(s) present in the reaction medium of the step E1).

The polyaddition reaction of step E1 may be carried out in the presence or absence of at least one reaction catalyst.

The reaction catalyst(s) that can be used during the polyaddition reaction of step E1 may be any catalyst known to those skilled in the art for catalyzing the formation of polyurethane by reaction of at least one polyisocyanate with at least one polyol selected from polyether polyols and polyester polyols.

An amount ranging up to 0.3% by weight of catalyst(s) relative to the weight of the reaction medium of step E1 may be used. In particular, it is preferred to use from 0.02 to 0.2% by weight of catalyst(s) relative to the weight of the reaction medium of step E1.

Preferably, the NCO-terminated polyurethane prepolymer is obtained by polyaddition of one or two aromatic or aliphatic polyisocyanates as described in any one of the preceding paragraphs, with one or two polyols selected from polyether polyols and polyester polyols, in the presence of at least one reaction catalyst, at a reaction temperature T1 below 95° C. and preferably ranging from 65° C. to 80° C., under anhydrous conditions, and with amounts of diisocyanate(s) and of polyol(s) that preferably result in an NCO/OH molar ratio, r1, ranging from 1.6 to 1.9, preferably from 1.69 to 1.85.

The glycerol carbonate that can be used according to the invention may be used either pure, or in the form of a mixture or a composition of glycerol carbonate containing preferably at least 90% by weight of glycerol carbonate and preferably at most 3% by weight of residual polyol compound(s) (glycerin) derived from the synthesis of said glycerol carbonate. In the latter case, the content of residual polyol compound(s) (glycerin) derived from the synthesis of said glycerol carbonate is such that the mean hydroxyl value of said glycerol carbonate composition ranges from 475 to 510 mg KOH/g of composition.

Such compositions are available commercially and the name Jeffsol® Glycerine Carbonate, from a Huntsman.

The amount of glycerol carbonate used during step E2 is such that the molar ratio NCO/O, denoted by r2, ranges from 0.9 to 1, and preferably from 0.95 to 1.0.

When the glycerol carbonate used is in the form of a composition or mixture as described above, the calculation of the ratio r2 takes into account, on the one hand, NCO groups borne by all of the isocyanates present in the reaction medium of step E2 (NCO-terminated polyurethane prepolymer and optionally the unreacted polyisocyanates that were used for the synthesis thereof) and, on the other hand, OH groups borne by the glycerol carbonate, but also the residual polyol compound(s) (glycerin) optionally as a mixture with the glycerol carbonate.

According to one more preferred embodiment of the process for preparing a cyclocarbonate-terminated polyurethane prepolymer, this process consists of a first step E1 and of a second step E2, as defined in any one of the preceding paragraphs.

The composition A may further comprise at least one solvent, preferably in an amount ranging from 10% to 50% by weight, more preferentially ranging from 15% to 40% by weight, and better still ranging from 20% to 30% by weight, relative to the total weight of the composition A.

The solvent may be selected from organic and alcoholic solvents such as ethyl acetate, methyl ethyl ketone, xylene, ethanol, isopropanol, tetrahydrofuran, methyltetrahydrofuran, or else from Isane® (based on isoparaffins, available from Total) or Exxol® D80 (based on aliphatic hydrocarbons, available from ExxonMobil Chemical).

According to one embodiment, the composition A has a viscosity measured at ambient temperature (23° C.) ranging from 500 to 10,000 mPa·s, preferably ranging from 1000 to 5000 mPa·s.

Composition B

The composition B comprises at least one diamine B1 and at least one polyamine B2.

The diamine(s) B1 comprise only two —CH$_2$NH$_2$ groups. Preferably, the diamine(s) B1 correspond to one of the formulae (II) or (III) below:

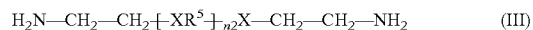

in which:

$R^4$ is a linear, branched, alicyclic or aromatic divalent radical such that the molar mass of the diamine B1 ranges from 100 to 600 g/mol;

$R^5$ represents a linear or branched alkylene divalent radical comprising from 2 to 4 carbon atoms, preferentially of ethylene and/or propylene type, with X=O, S, NH or NR$^6$ in which $R^6$ is a linear or branched, saturated or unsaturated, C$_1$-C$_{20}$ alkyl group.

n1 and n2 are integers such that the molar mass of the diamine B1 ranges from 100 to 600 g/mol.

Mention may be made, as examples of diamines B1, of diethylenetriamine (DETA) corresponding to the formula: H$_2$N—CH$_2$—CH$_2$—NH—CH$_2$—CH$_2$—NH$_2$ having a primary alkalinity of 19.39 meq/g, 1,10-decanediamine H$_2$N—(CH$_2$)$_{10}$—NH$_2$ having a primary alkalinity of 11.61 meq/g, or else the polyetherdiamine of formula: H$_2$N—CH$_2$—CH$_2$—O—CH$_2$—CH$_2$—O—CH$_2$—CH$_2$—NH$_2$ having a primary alkalinity of 13.49 meq/g (available under the trade name Jeffamine® ED 148 from Huntsman).

Other examples of diamines B1 that may be used are dimer fatty amines comprising two primary amine groups having a primary alkalinity ranging from 3.39 meq/g to 3.70 meq/g. These dimer fatty amines may be obtained from corresponding dimerized fatty acids. Mention may be made, as examples of such dimer fatty amines, of Priamine® 1071 (available from Croda) or those corresponding to the following formulae:

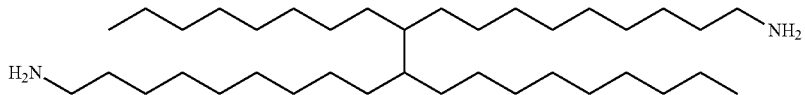

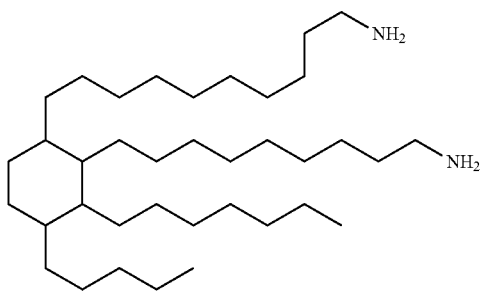

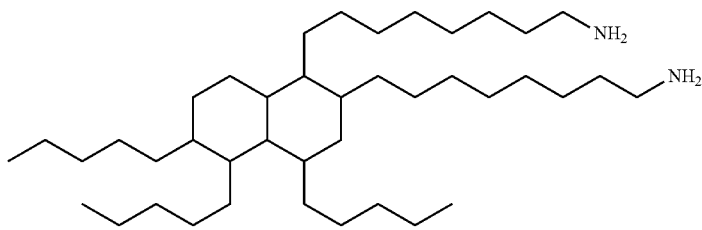

The dimer fatty acids used to prepare the abovementioned fatty amines are obtained by high-temperature polymerization under pressure of unsaturated fatty monocarboxylic acids (monomer acid) comprising from 6 to 22 carbon atoms, preferably from 12 to 20 carbon atoms, and originate from plant or animal sources. Mention may be made, as examples of such unsaturated fatty acids, of $C_{18}$ acids having one or two double bonds (respectively oleic acid or linoleic acid) obtained from tall oil, which is a byproduct of the manufacture of paper pulp. After polymerization of these unsaturated fatty acids, a technical mixture is obtained which contains, on average, 30-35% by weight of fatty monocarboxylic acids, often isomerized, relative to the starting unsaturated fatty monocarboxylic acids, 60-65% by weight of dicarboxylic acids (dimer acids) comprising twice the carbon number relative to the starting unsaturated fatty monocarboxylic acids. The various commercial grades of dimer, monomer or trimer acids are obtained by purification of this mixture. These dimer fatty acids are subsequently subjected to a reductive ammoniation ($NH_3/H_2$) reaction in the presence of a catalyst, making it possible to obtain the dimerized fatty amines.

According to one embodiment, the diamine (or the mixture of diamines) B1 has an (average) molar mass ranging from 100 to 650 g/mol.

According to one embodiment of the invention, the diamine or the mixture of diamines B1 has a primary alkalinity ranging from 3.00 to 20.00 meq $NH_2$/g, preferably from 9.00 to 15.00 meq/g.

The polyamine(s) B2 comprise at least three —$CH_2$—$NH_2$ groups, preferably at least four —$CH_2$—$NH_2$ groups.

According to one embodiment, the polyamine(s) B2 are selected from polyethyleneimines (PEI), polyethyleneimine dendrimers, polypropyleneimines (PPI), polypropyleneimine dendrimers, poly(propylene-ethylene)imines, polyallylamines, tris(aminoethyl)amine (TAEA) and tris(aminopropyl)amine (TAPA). Preferably, the polyamine(s) B2 are selected from polyethyleneimines (PEI) and poly(ethylene-propylene)imines.

The polyamine(s) B2 may be selected from the compounds of structure:

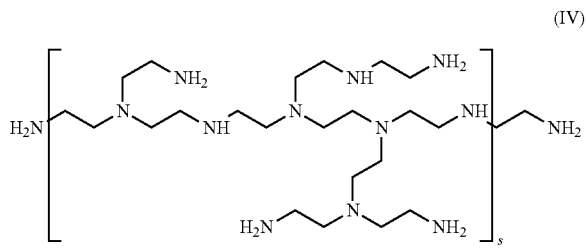

(IV)

where s is an integer, such that the molar mass is within the interval ranging from 130 to 1800 g/mol, preferably ranging from 140 to 1700 g/mol;

15
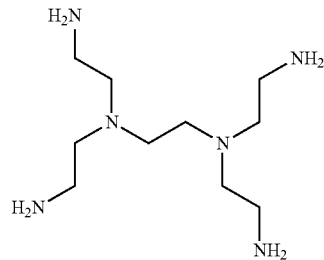
(V)
16
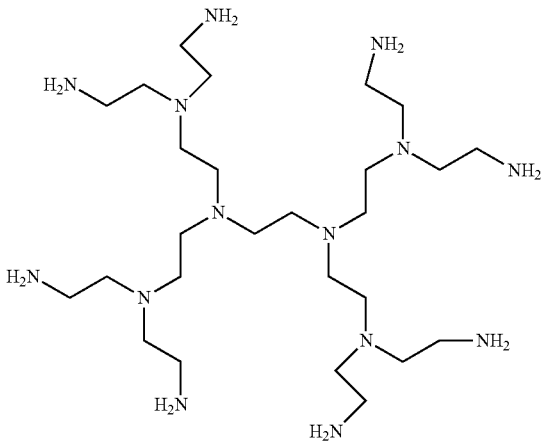
(VI)
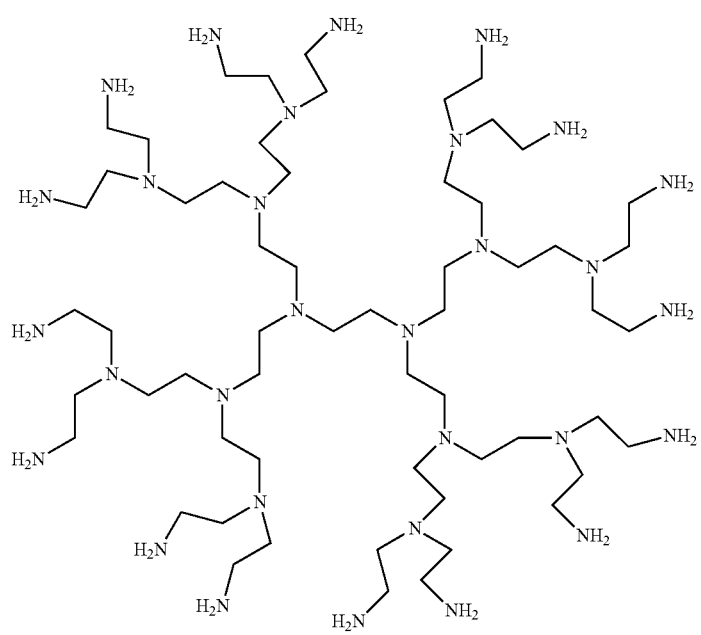
(VII)
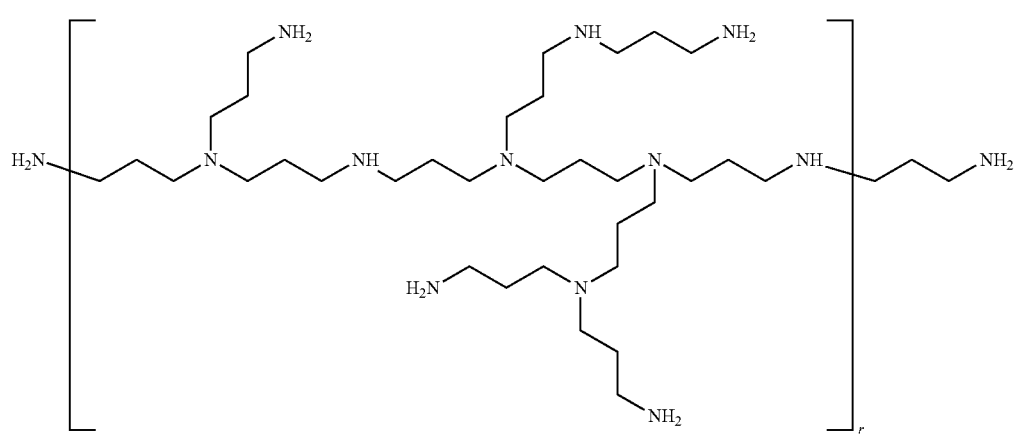
(VIII)

where r is an integer, such that the molar mass is within the interval ranging from 130 to 1800 g/mol, preferably ranging from 140 to 1700 g/mol;
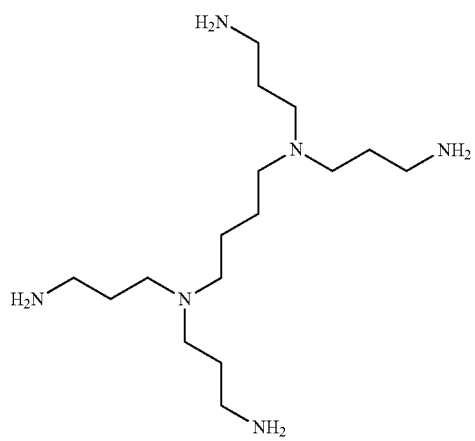
(IX)
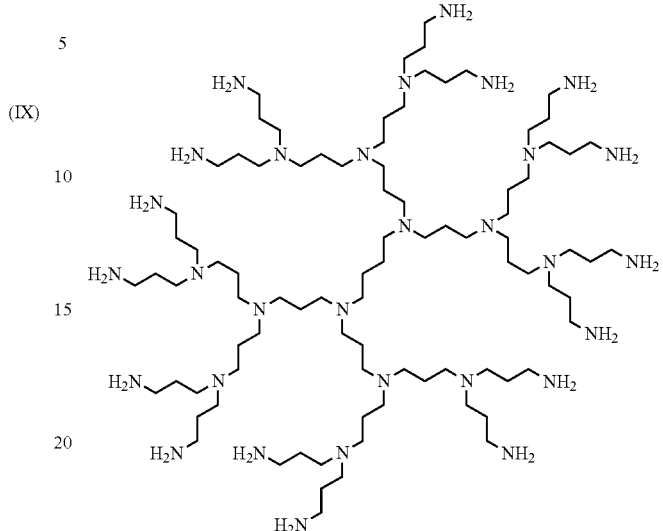
(XI)
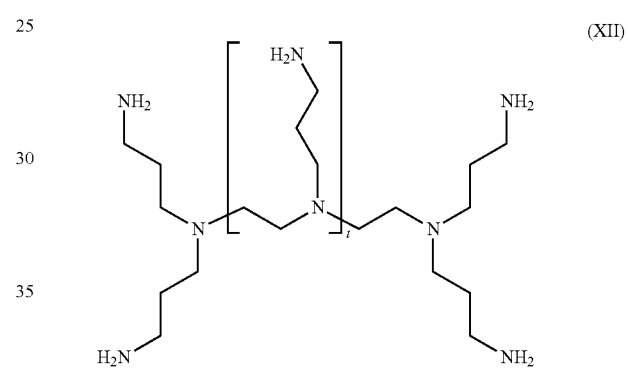
(XII)
where t is an integer, such that the molar mass is within the interval ranging from 130 to 1800 g/mol, preferably ranging from 140 to 1700 g/mol;
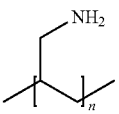
(XIII)
where n is an integer ranging from 3 to 20;
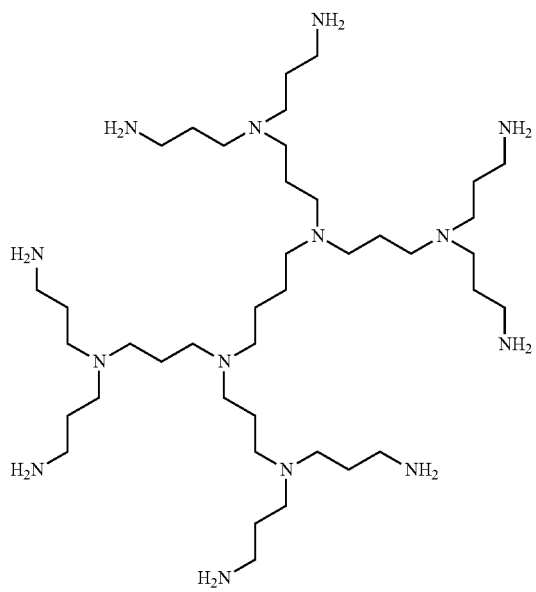
(X)
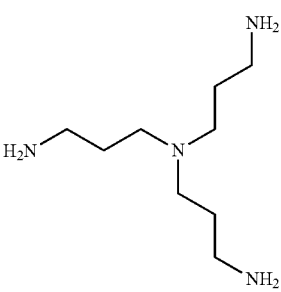
(XIV)

(XV)

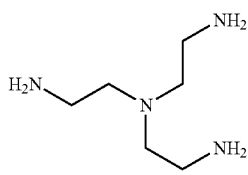

According to one embodiment, the polyamine or the mixture of polyamines B2 has a primary alkalinity ranging from 8.00 to 21.00 meq/g, preferably ranging from 9.00 to 18.00 meq/g.

According to one embodiment of the invention, the polyamine(s) B2 has (have) an (average) molar mass ranging from 130 to 1800 g/mol, preferably ranging from 140 to 1700 g/mol.

According to one embodiment, the composition B has a primary alkalinity/total alkalinity ratio ranging from 0.25 to 0.70.

The diamine B1:polyamine B2 weight ratio in the composition B ranges from 30/70 to 70/30, preferably from 40/60 to 60/40, and better still is around 50/50.

The composition B may be prepared by simple mixing of the constituents, preferably at a temperature ranging from 10° C. to 50° C., preferably at ambient temperature, preferably with the aid of a mechanical mixer.

Adhesive Composition

According to one embodiment of the invention, the $NH_2$/cyclocarbonate molar ratio within the adhesive composition (r3) ranges from 0.8 to 1.2, preferably from 0.9 to 1.1, or is around 1.0.

According to one embodiment of the invention, the weight ratio between the composition A and the composition B, within the adhesive composition, ranges from 100/3 to 100/50.

The adhesive composition according to the invention may comprise at least one crosslinking catalyst. The crosslinking catalyst may be present in the composition A and/or in the composition B, preferably in the composition A.

The crosslinking catalyst(s) may be any catalyst customarily used to accelerate the ring-opening reaction of a compound comprising a (2-oxo-1,3-dioxolan-4-yl)methyl carbamate cyclocarbonate group by a primary amine.

Mention may be made, as examples of crosslinking catalysts that can be used according to the invention, of:

alkoxides, such as potassium tert-butoxide or sodium methoxide;

strong bases selected from:

phosphazenes, such as 2-(tert-butylimino)-2-diethylamino-1,3-dimethylperhydro-1,3,2-diazaphosphorine (BMEP), guanidines, such as:

1,5,7-triazabicyclo[4.4.0]dec-5-ene (TBD):

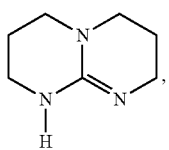

N-methyltriazabicyclodecene (Me-TBD):

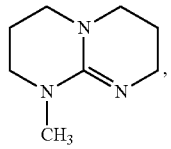

tertiary amines, such as:

1,8-diazabicyclo[5.4.0]undec-7-ene (DBU):

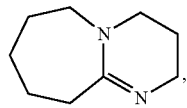

1,5-diazabicyclo[4.3.0]non-5-ene (DBN):

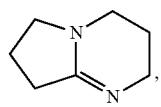

2,2'-dimorpholinodiethyl ether (DMDEE):

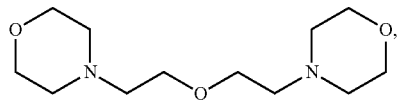 [SMILES: C1CN(CCOCCN2CCOCC2)CCO1]

1,4-diazabicyclo[2.2.2]octane (DABCO):

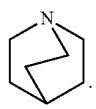

An amount ranging from 0.03 to 3% by weight, or from 0.05 to 1% by weight, of crosslinking catalyst(s), relative to the total weight of the adhesive composition according to the invention, may be used.

The crosslinking catalyst(s) may be distributed in one or more of the compositions (for example in composition A and/or in composition B defined above) forming the two-component adhesive composition according to the invention.

The adhesive composition according to the invention may further comprise at least one mineral filler, preferably in an amount that does not exceed 70% by weight of the weight of the adhesive composition. The filler(s) may be present in composition A and/or in composition B.

The mineral filler(s) that can be used is (are) selected so as to improve the mechanical performance of the composition according to the invention in the crosslinked state.

Mention may be made, non-limitingly, as examples of filler(s) that can be used, of calcium carbonate, kaolin, silica, gypsum, microspheres and clays.

Preferably, the mineral filler(s) has (have) a maximum particle size, in particular an external diameter, of less than 100 μm and preferably of less than 10 μm. Such fillers may be selected, in a manner well known to those skilled in the art, by using screens having appropriate meshes.

The adhesive composition according to the invention may further comprise at least one adhesion promoter, preferably selected from silanes, aminosilanes or acryloyl silanes. The adhesion promoter(s) may be present in composition A and/or in composition B, preferably in composition A.

The adhesive composition according to the invention may include up to 2% by weight of one or more other additives appropriately selected in order not to damage the properties of the adhesive composition according to the invention in the crosslinked state. Mention may be made, among the additives that can be used, of UV (ultraviolet) stabilizers or antioxidants, pigments and dyes. These additives are preferably selected from those customarily used in adhesive compositions.

The other additive(s) may be distributed in one or more of the compositions forming the two-component adhesive composition according to the invention.

Ready-to-Use Kit

The present invention also relates to a ready-to-use kit comprising the composition A as defined above on the one hand and the composition B as defined above on the other hand, packaged in two separate compartments.

Specifically, the adhesive composition according to the invention may be in a two-component form, for example within a ready-to-use kit, comprising the composition A on the one hand in a first compartment or barrel and the composition B on the other hand in a second compartment or barrel, in proportions suitable for direct mixing of the two compositions, for example with the aid of a metering pump.

According to one embodiment of the invention, the kit further comprises one or more means for mixing the two compositions A and B. Preferably, the mixing means are selected from metering pumps, and static mixers having a diameter suitable for the quantities used.

Multilayer (Complex) Structure

Another subject of the present invention is a multilayer (complex) structure comprising at least two layers of material bonded together by an adhesive layer, characterized in that said adhesive layer consists of the adhesive composition according to the invention, in the crosslinked state.

The adhesive layer preferably has a thickness ranging from 1.5 to 5 µm. The adhesive layer is obtained by crosslinking of the adhesive composition, in an amount preferably ranging from 1.5 to 5 g/m².

The materials of which the layers of material surrounding the adhesive layer consist are generally selected from paper, a metal, such as for example aluminum, or thermoplastic polymers such as:
  polyethylene (PE),
  polypropylene (PP),
  a copolymer based on ethylene and propylene,
  polyamide (PA),
  polyethylene terephthalate (PET), or else
  a copolymer based on ethylene such as for example a maleic anhydride grafted copolymer, an ethylene/vinyl acetate copolymer (EVA), an ethylene/vinyl alcohol copolymer (EVOH), a copolymer of ethylene and an alkyl acrylate such as methyl acrylate (EMA) or butyl acrylate (EBA),
  polystyrene (PS),
  polyvinyl chloride (PVC),
  polyvinylidene fluoride (PVDF),
  a polymer or copolymer of lactic acid (PLA), or
  a polyhydroxyalkanoate (PHA).

An individual layer of material may itself consist of several materials. It may be for example a layer of thermoplastic polymers that is obtained by coextruding two polymers; the individual layers of thermoplastic polymer may further be coated with a substance (for example based on aluminum oxide or on silicon oxide) or metallized (the case of PET metallized with aluminum particles) in order to add an additional barrier effect.

The thickness of the 2 layers of material adjacent to the adhesive layer and of the other layers of material used in the multilayer structure according to the invention is likely to vary to a large extent ranging for example from 5 to 150 µm. The total thickness of said structure is also likely to vary to a large extent ranging for example from 20 to 400 µm.

Preferably, the multilayer structure is in the form of a multilayer film.

Complexing Process

Another subject of the invention is a process for manufacturing the multilayer (complex) structure according to the invention comprising the following steps:
  the mixing of the composition A and of the composition B, then
  the coating of said mixture over the surface of a first layer, then
  the laminating of the surface of a second layer over said coated surface, then
  the crosslinking of said mixture.

The step of mixing the composition A and the composition B may be carried out at ambient temperature or at high temperature, before coating.

Preferably, the mixing is carried out at a temperature below the degradation temperature of the ingredients included in one or other of the compositions (A) and (B). In particular, the mixing is carried out at a temperature below 95° C., preferably ranging from 15 to 80° C., more preferably ranging from 25° C. to 50° C., in order to avoid any thermal degradation.

Preferably, the composition A and the composition B are mixed in amounts such that the molar ratio of the number of primary amine groups to the number of cyclocarbonate groups present in the mixture, denoted by r3, ranges from 0.8 to 1.2, preferably from 0.9 to 1.1.

According to one embodiment, when a solvent is present in the compositions A and/or B and/or when a solvent is added during the mixing of the composition A and the composition B, then the complexing process comprises a solvent evaporation step; said solvent evaporation step is then carried out before crosslinking of the mixture, preferably before the laminating step.

The coating of said mixture may be carried out over all or part of the surface of a material. In particular, the coating of said mixture may be carried out in the form of a layer with a thickness ranging from 1.5 to 5 µm. The coating is preferably carried out continuously or substantially continuously.

Optionally, the crosslinking of said mixture on the surface of the material may be accelerated by heating the coated material(s) at a temperature of less than or equal to 70° C.

The time required to complete this crosslinking reaction and to thus ensure the required degree of cohesion is generally of the order of from 0.5 to 24 hours.

The coating and laminating of the second material are generally carried out in a time interval compatible with the coating process, as is well known to those skilled in the art, i.e. before the adhesive layer loses its ability to fix the two materials by adhesive bonding.

Use of the Multilayer Structure

The invention finally relates to the use of the multilayer (complex) structure according to the invention for manufacturing flexible packagings. The complexes according to the invention are indeed able to be used for the manufacture of the most diverse flexible packagings, which are shaped then closed (after the step of packaging the product intended for the consumer) by heat sealing (or thermowelding) techniques.

In particular, the complex according to the invention may be used in the food packaging, without the risk of toxicity. The packagings intended for food are generally treated thermally at temperatures ranging from 60° C. to 135° C. before use. In particular, they may be pasteurized (at temperatures ranging from 70° C. to less than 100° C., for example from 70° C. to 99° C.) or sterilized (at temperatures ranging from 100° C. to 135° C.).

The multilayer structure according to the invention has the advantage of being able to be pasteurized or sterilized.

The invention will now be described in the following exemplary embodiments, which are given purely by way of illustration, and should not be interpreted in a manner that limits the scope thereof.

EXAMPLES

The following ingredients were used:

Composition A

Voranol® P 400: difunctional polypropylene glycol having a hydroxyl value OHV ranging from 250 to 270 mg KOH/g (available from Dow);

Voranol® CP 450: trifunctional polypropylene glycol having a hydroxyl value OHV ranging from 370 to 396 mg KOH/g (available from Dow);

Realkyd® XTR 10410: difunctional polyester polyol having a hydroxyl value OHV ranging from 108 to 116 mg KOH/g (available from Arkema);

Scuranate® TX: toluene diisocyanate (TDI) having 48.1% by weight of NCO functions and comprising 95% by weight of 2,4-TDI isomer (available from Vencorex);

Desmodur® N3300: isocyanurate of hexamethylene diisocyanate (HDI) (available from Covestro);

Jeffsol® GC: glycerol carbonate having a purity of 93% by weight (available from Huntsman);

ethyl acetate: solvent

Borchi Kat® 315: catalyst based on bismuth neodecanoate (available from Borchers);

Tyzor Pita®: catalyst based on titanium ethylacetoacetate (available from Dorf Ketal);

Silquest® A1110: adhesion promoter of (3-aminopropyl) trimethoxysilane type (available from Momentive).

The polyol(s) is (are) dried before being reacted with the polyisocyanate(s) used for the synthesis of the polyurethane prepolymer.

Composition B

Jeffamine® ED 148 (available from Huntsman): diamine (of B1 type) having a molar mass of 148.20 g/mol and a primary alkalinity of 13.49 meq/g and corresponding to the formula $H_2N-CH_2-CH_2-O-CH_2-CH_2-O-CH_2-CH_2-NH_2$. Jeffamine® ED 148 has a primary alkalinity/total alkalinity ratio of 1.00 determined by potentiometric analysis;

Lupasol® FG (available from BASF): polyamine (of B2 type) having a molar mass of 800 g/mol and a primary alkalinity of 9.75 meq/g and corresponding to the general formula (IV):

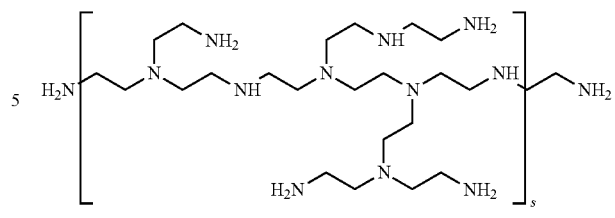

s being as defined above.

Lupasol® FG has a primary alkalinity/total alkalinity ratio of 0.42 determined by $^{13}C$ NMR.

—$H_2N$—$(CH_2)_{10}$—$NH_2$: diamine (of B1 type) having a molar mass of 172 g/mol and a primary alkalinity of 11.61 meq/g.

$H_2N$—$(CH_2)_{10}$—$NH_2$ has a primary alkalinity/total alkalinity ratio of 1.00, determined by potentiometric analysis.

Example 1: Preparation of a Composition A-1 Based on a Cyclocarbonate-Terminated Polyurethane Prepolymer Based on Polyether Polyols and Polyester Polyols 190.7 g of Scuranate® TX are introduced into a reactor and heated at 40° C. Next, 22.7 g of Voranol® CP 450, then 103.3 g of Voranol® P 400 are introduced in turn making sure that the temperature of the mixture does not exceed 80° C. When the mixture temperature is stabilized, the mixture is heated for around 1 hour at 80-85° C., then cooled to 70° C. Next, 321.6 g of Realkyd® XTR 10410 are introduced making sure that the temperature of the mixture does not exceed 90° C.

The mixture is kept at 90° C. for around 3 hours. The end of the reaction is followed by monitoring the weight percentage of NCO functions in the medium, the latter having to be, in theory, around 5.7%. When the reaction is finished, the mixture is cooled to 70° C. and 103.4 g of glycerol carbonate and 0.5 g of Tyzor Pita® are introduced. 100 g of ethyl acetate and 7.5 g of Silquest® A1110 are added then the mixture is kept at 70° C. for 6 to 8 hours until there are no more NCO functions visible in the infrared (IR) (disappearance of the band characteristic of the NCO function at around 2250 cm$^{-1}$).

When the weight percentage of NCO functions is less than 0.1% (no more visible NCO band), 150 g of ethyl acetate are introduced. The viscosity of the composition A-1 thus obtained is measured at D+1, i.e. 24 hours after the end of the reaction (disappearance of the NCO band visible in the IR), with the aid of a Brookfield viscometer (spindle 3, 20 rpm). The viscosity of the composition A-1 at 23° C. is around 3900 mPa·s.

The cyclocarbonate function content of the cyclocarbonate-terminated polyurethane prepolymer is around 0.82 meq/g.

Example 2: Preparation of a Composition A-2 Based on a Cyclocarbonate-Terminated Polyurethane Prepolymer Based on Polyether Polyols and Polyester Polyols 143.2 g of Scuranate® TX are introduced into a reactor and heated at 40° C. 22.6 g of Voranol® CP 450 are slowly introduced and the mixture is heated at 50° C. Next, 101.6 g of Voranol® P 400 are added. The exotherm of the reaction mass increases to around 70° C. Once the exotherm is controlled, the mixture is kept at 70° C. After reacting for one hour, 241.4 g of Realkyd® XTR 10410 are introduced. The exotherm of the reaction mass increases up to around 85° C. The mixture is kept at 85° C. for around 2-3 hours. The end of the reaction is followed by monitoring the weight percentage of NCO functions in the medium, the latter having to be, in theory, around 4.4% by weight. When the reaction is finished, the mixture is cooled to 70° C. and 76.6 g of Desmodur® N3300 and 100 g of ethyl acetate are introduced. The mixture is homogenized for 20 minutes then 114 g of Jeffsol® GC are added. 0.45 g of Tyzor Pita® is added, then the mixture is kept at 80-85° C. for 3 hours until there are no more NCO functions visible in the IR (disappearance of the band characteristic of the NCO function at around 2250 cm$^{-1}$).

When the weight percentage of NCO functions is less than 0.1% (no more visible NCO band), 200 g of ethyl acetate are introduced. The viscosity of the composition A-2 thus obtained is measured at D+1, i.e. 24 hours after the end of the reaction (disappearance of the NCO band visible in the IR), with the aid of a Brookfield viscometer (spindle 3, 20 rpm). The viscosity of the composition A-2 at 23° C. is around 3000 mPa·s.

The cyclocarbonate function content of the cyclocarbonate-terminated prepolymer is around 0.90 meq/g.

Example 3: Preparation of the Compositions B

The compositions B which were tested were prepared by simple mixing of the diamine B1 (Jeffamine® ED 148 or $H_2N-(CH_2)_{10}-NH_2$) and/or of the polyamine B2 (Lupasol® FG) at ambient temperature (around 23° C.) in a B1/B2 weight ratio indicated below in table 1.

Example 4: Preparation of the Adhesive Compositions

The mixing of the compositions A and B described in detail in examples 1 to 3 was carried out in an A/B weight ratio indicated below in table 1.

Example 5: Preparation of the Complexes

Preparation of the supports: the layers of material are cut to the desired format and stapled to a Bristol record card.

Preparation of the adhesive composition: the composition A and the composition B are mixed in a glass flask, with an optional addition of ethyl acetate. In the latter case, the solids content of the adhesive composition is around 30% by weight in order to have a spread of the order of 3.5 to 5 g/m$^2$ for each of the interfaces between two substrates.

Production of the multilayer (complex) structure:
   the adhesive is applied to an aluminum layer reinforced with polyethylene terephthalate (PET) with the aid of an applicator with a Mayer rod,
   clips are used to hold the support on the Bristol record card on the non-stapled side and the support is placed in a ventilated oven for 2 minutes at 105° C. to evaporate the solvent,
   the adhesive-coated support and the support to be laminated are stapled together over one edge. The clips are removed and the lamination takes place with the aid of a press roller,
   the complexies placed in a press and left is crosslink either at ambient temperature or in a ventilated oven at 40° C. in a press (metal plates).

Various complexes were prepared using a PET12/ALU9/CPP70 three-layer system defined below, each layer being separated by an adhesive layer as described in detail in table 2 below:

TABLE 2

| characteristic of the complexes | | |
|---|---|---|
| | Adhesive composition | Spread (g/m$^2$) |
| Film 1 | Composition 1 (comparative) | 4.3 |
| Film 2 | Composition 2 (comparative) | 4.3 |

TABLE 1

| characteristic of the adhesive compositions tested | | | | | |
|---|---|---|---|---|---|
| | nature of A | nature of B | B1/B2 ratio | A/B ratio | NH$_2$/CC molar ratio |
| Composition 1 (comparative) | A-1 | Jeffamine ® ED148 | — | 100/6.5 | 0.93 |
| Composition 2 (comparative) | A-1 | B2 | — | 100/7 | 0.83 |
| Composition 3 | A-1 | Jeffamine ® ED148 + B2 | 1/1 | 100/6.8 | 0.96 |
| Composition 4 | A-1 | H$_2$N—(CH$_2$)$_{10}$—NH$_2$ + B2$^{(1)}$ | 1/1 | 100/25 | 0.94 |
| Composition 5 | A-2 | Jeffamine ® ED148 + B2 | 1/1 | 100/8.3 | 0.93 |
| Composition 6 (comparative) | A-2 | Jeffamine ® ED148 + B2 | 8/2 | 100/7.6 | 0.93 |

$^{(1)}$the composition B comprising the mixture of B1 and B2 was diluted to 29% by weight in an ethanol solvent.
Compositions 1 to 6 were prepared either from the composition A of example 1 (A-1) or from the composition A of example 2 (A-2).
Compositions 3 to 5 according to the invention were prepared from a composition B comprising a diamine of B1 type and a polyamine of B2 type.
Comparative compositions 1 and 2 were prepared respectively from the diamine B1 (composition 1) and from the polyamine B2 (composition 2).
Comparative composition 6 was prepared from a composition B, the B1/B2 weight ratio of which is too high.
The NH$_2$/CC ratio represents the molar ratio of the number of primary amine functions to the number of cyclocarbonate functions present in the adhesive composition (A + B).

TABLE 2-continued

| | characteristic of the complexes | |
|---|---|---|
| | Adhesive composition | Spread (g/m²) |
| Film 3 | Composition 3 | 4.5 |
| Film 4 | Composition 4 | 3.8 |
| Film 5 | Composition 5 | 4.5 |
| Film 6 | Composition 6 (comparative) | 4.8 |

PET12/ALU9/CPP70: system consisting of a layer of polyethylene terephthalate with a thickness of 12 μm (PET12), a layer of cast polypropylene with a thickness of 70 μm (CPP70) and a thin layer of aluminum with a thickness of 9 μm (ALU9) positioned between the two PET12 and CPP70 layers.

Example 6: Measurement of the Cohesion of the Complexes of Example 5 Before and after Sterilization Test and Qualitative Assessment of the Resistance of Said Complexes to Sterilization 180° Peel (Measurement of the Cohesion):

The cohesion of the complex is evaluated by the 180° peel test as described in French standard NF T 54-122. The principle of this test consists of the determination of the force necessary for separating (or peeling) 2 individual layers of complex bonded by the adhesive.

A test specimen of rectangular shape, 15 mm wide and around 15 cm long, is cut from the two-layer complex. The test specimens are cut in the machine direction of the coating operation. The two individual layers of complex included in this strip are manually detached from the end of this test specimen, and over approximately 2 cm, and the two free ends thus obtained are attached to two holding devices respectively connected to a stationary part and a movable part of a tensile testing device which are located on a vertical axis.

While a drive mechanism imparts a uniform rate of 100 mm/minute to the movable part, resulting in the detachment of the two layers, the detached ends of which gradually move along a vertical axis forming an angle of 180°, the stationary part—connected to a dynamometer DY30—measures the force withstood by the test specimen thus held, which force is measured in newtons (N).

Each test is repeated 3 times and the mean value of the three measurements is indicated in table 3 below.

The measurement of the cohesion before sterilization was carried out 7 days after the manufacture of the multilayer film (D+7).

As illustrated in table 3 below, the cohesion was also measured 24 hours after sterilization.

Qualitative Assessment of the Resistance to Sterilization

The quality of the adhesion between the layers of material of the multilayer structures tested was also evaluated after sterilization.

In particular, the presence or absence of blisters, which may be of various shapes (for example channels or domes), or bubbles was noted. The presence of these deformations of the multilayer structure leads to infiltration of water between the layers of the multilayer structure resulting in the degradation of the adhesive during the sterilization.

Moreover, it was verified whether the adhesive is de-crosslinked during the sterilization. For this, after having carried out the peel test described above on each of the films tested, the presence or absence of tack was evaluated by exerting a slight pressure of the index finger on the surface of the layer of adhesive left visible after separation of the layers of material.

The observations are recorded in table 3 below.

Sterilization Test

In the present example, the sterilization test was carried out once the adhesive was crosslinked within the complex (around 7 days after preparation of the complex in accordance with example 5). Sachets were prepared from a complex prepared in example 5, without sealing the fourth side. The sachets are placed on the shelf of an autoclave (vapor phase) and left for 1 hour at 130° C. in the autoclave under 3 bar.

TABLE 3

| | | Cohesion measurement | | | | | |
|---|---|---|---|---|---|---|---|
| | | Film 1 comparative | Film 2 comparative | Film 3 | Film 4 | Film 5 | Film 6 comparative |
| Before sterilization | Time t | (D + 7) | (D + 7) | (D + 7) | (D + 7) | (D + 7) | (D + 7) |
| | Cohesion at time t (N/15 mm) | 4.5 | 5.7 | 4.8 | 6 | 4.8 | 5.5 |
| | Observations at time t | tack | no tack-Al tear | no tack-Al tear | no tack-Al tear | no tack-Al tear | no tack-Al tear |
| 24 h after sterilization | Cohesion (N/15 mm) | 0.15 | 3 | 4.1 | 3 | 4.4 | 5 |
| | Observations | tack channels | tack | no tack no channels | no tack no channels | no tack no channels | tack channels |

In table 3 above:

when "no tack" is observed, then the film passes the sterilization test, when "tack" is observed, then the film does not pass the sterilization test, when channels are observed, then the film does not pass the sterilization test, when a tear is observed, then the film passes the sterilization test.

The invention claimed is:

1. An adhesive composition comprising:
   a composition A comprising at least one cyclocarbonate-terminated polyurethane prepolymer, and
   a composition B comprising:
      at least one diamine B1 comprising only two —CH₂—NH₂ groups, and at least one polyamine B2 comprising at least three —CH$_2$—NH$_2$ groups, wherein the diamine B1:polyamine B2 weight ratio ranges from 30/70 to 70/30.

2. The composition as claimed in claim 1, wherein the cyclocarbonate-terminated polyurethane prepolymer is obtained by reacting an NCO-terminated polyurethane and a glycerol cyclocarbonate.

3. The adhesive composition as claimed in claim 1, wherein the cyclocarbonate-terminated polyurethane prepolymer is prepared by a process comprising the following steps:
   E1) preparing an NCO-terminated polyurethane prepolymer by a polyaddition reaction comprising reacting at least one polyisocyanate selected from the group consisting of diisocyanates and triisocyanates with at least one polyol selected from the group consisting of polyether polyols and polyester polyols, and mixtures thereof; followed by
   E2) reacting the product formed in the first step E1) with at least one glycerol cyclocarbonate in an amount such that all of the NCO groups present in the reaction medium at the end of step E1) react in the presence of the glycerol carbonate.

4. The adhesive composition as claimed in claim 3, wherein at least one polyol is selected from polyester polyols.

5. The adhesive composition as claimed in claim 1, wherein the diamine or the mixture of diamines B1 has a primary alkalinity ranging from 3.00 to 20.00 meq/g.

6. The adhesive composition as claimed in claim 1, wherein the polyamine or the mixture of polyamines B2 has a primary alkalinity from 8.00 to 21.00 meq/g.

7. The adhesive composition as claimed in claim 1, wherein the composition B has a ratio of the primary alkalinity to the total alkalinity ranging from 0.25 to 0.70.

8. The adhesive composition as claimed in claim 1, wherein the molar ratio of the number of primary amine functions to the number of cyclocarbonate functions ranges from 0.8 to 1.2.

9. The adhesive composition as claimed in claim 1, further comprising at least one crosslinking catalyst.

10. A ready-to-use kit comprising the adhesive composition as claimed in claim 1, wherein the compositions A and B are packaged in two separate compartments.

11. A multilayer structure comprising at least two layers of material bonded together by an adhesive layer, wherein said adhesive layer comprises the adhesive composition as claimed in claim 1, in a crosslinked state.

12. The multilayer structure as claimed in claim 11, wherein the adhesive layer has a thickness ranging from 1.5 to 5 μm.

13. The multilayer structure as claimed in claim 11, comprising at least one layer of aluminum-based material.

14. A process for manufacturing a multilayer structure as claimed in claim 11, comprising the following steps:
   mixing the composition A and the composition B to form a mixture, then
   coating said mixture over a surface of a first layer of material to form a coated surface, then
   laminating a surface of a second layer of material over said coated surface, then
   crosslinking said mixture.

15. The manufacturing process as claimed in claim 14, wherein the mixture of the composition A and the composition B comprises at least one solvent and wherein the process further comprises a step of evaporating the solvent(s).

* * * * *